United States Patent [19]
Opelt

[11] 3,943,562
[45] Mar. 9, 1976

[54] ARRANGEMENT FOR AUTOMATIC TRACK SEARCHING FOR OBLIQUE TRACK RECORDINGS

[75] Inventor: Christian Opelt, Bernbach, Germany

[73] Assignee: Grundig E.M.V. Elektro-Mechanische, Fuerth Bay., Germany

[22] Filed: Apr. 1, 1974

[21] Appl. No.: 457,134

[30] Foreign Application Priority Data
Apr. 4, 1973   Germany............................ 2316803

[52] U.S. Cl. ...................... 360/10; 360/72; 360/73
[51] Int. Cl.² ................H04N 5/795; G11B 15/52; G11B 27/22
[58] Field of Search ............ 360/10, 72, 74, 84, 73; 178/6.6 FS, 6.6 P

[56] References Cited
UNITED STATES PATENTS
3,557,320   1/1971   Hopf..................................... 360/10
FOREIGN PATENTS OR APPLICATIONS
45-26,802   9/1970   Japan................................... 360/10

*Primary Examiner*—Raymond F. Cardillo, Jr.
*Attorney, Agent, or Firm*—Haseltine, Lake & Waters

[57] ABSTRACT

Apparatus is provided for automatic video track searching during the reproduction of still pictures from oblique magnetic video track recordings on a magnetic tape. The apparatus is adapted for use in a system including a rotating magnetic-head drum capable of generating position pulses. The apparatus provides for arbitrarily switching the tape-transport motor down to a slow speed and for a braking circuit to stop the tape-transport motor. A detecting circuit is provided to form a voltage envelope curve from signals generated by the video head or video heads, and a phase shifter for the position pulses compensates for phase errors in the machinery and circuitry. The apparatus also provides for the aforesaid switching upon a temporal coincidence between minima of a aforesaid envelope curve and the phase compensated position pulses. A sample and hold circuit scans the aforesaid envelope curve at times controlled by the phase compensated position pulses. The scanned signal is integrated and differentiated and, through a pulse shaper, operates upon the aforesaid switching means to bring the slow tape-transport motor motion to a complete stop.

4 Claims, 4 Drawing Figures

ARRANGEMENT FOR AUTOMATIC TRACK SEARCHING FOR OBLIQUE TRACK RECORDINGS

FIELD OF THE INVENTION

The invention relates to arrangements for automatic track searching in the reproduction of still pictures from oblique magnetic video track recordings.

BACKGROUND

Oblique magnetic track recording is known to be particularly suitable for the stationary reproduction of single pictures, because a picture field or a picture frame can be recorded in one oblique track. The only difficulty which occurs results from the differences in inclination between the video heads which scan during tape stops and the magnetic tracks which are recorded at normal tape speed.

As will be described in further detail hereinafter, oblique tracks can be recorded on a magnetic tape at normal tape speed and scanned at tape stop. These tracks may occupy favorable or unfavorable positions with reference to signal-to-noise ratio. This is because the areas which overlap the space between the tracks fall on the picture edges or on the vertical blanking intervals.

Establishing a favorable track position manually by back-and-forth rotation of the tape reels can only be accomplished with much labor, and sometimes is practically impossible such as, for example, with coaxial reel arrangements. An arrangement for automatic track searching has already been disclosed in a publicly available German application (DT-OS No. 2,115,457). In this arrangement, temporal coincidence is determined between the occurrence of the scanned maximum of the envelope curve and the occurrence of a vertical synchronizing pulse. With the aid of control logic for the tape transport motor, provision is made, by means of one or several back-and-forth motions, such that this places the maximum of the envelope curve into the temporal middle of a picture field. In other words, the optimum position of a scanning track is achieved by causing the maximum of the envelope curve to coincide with half the time interval between two vertical pulses.

This process can clearly function satisfactorily only if the recorded oblique tracks actually are ideal straight lines. However, in general, this is not the case because minor variations in tape stretch or other factors cause a slight wave-shape or crooked course in the recorded oblique track.

For this reason, the maximum of the envelope curve does not occur exactly at the track center, but, on the contrary, is somewhat displaced. In this case and when the automatic track search of the prior art forces a coincidence between the maximum of the envelope curve and the temporal middle of a picture field, the scanned voltage of the envelope curve may have its minimum within the visible video picture.

SUMMARY OF THE INVENTION

It is an object of the invention to provide improved means for automatic track searching in connection with oblique magnetic video track recordings.

A further object of the invention is to provide improved means for the reproduction of still pictures from oblique magnetic video track recordings on a magnetic tape.

It is still a further object of the invention to provide improved apparatus of the above-noted type wherein the minima of an envelope curve resulting from the detecting of scanned video signals do not coincide with the visible video picture but with vertical blanking intervals.

The above and other objects of the invention are achieved by the provision of an apparatus for automatic video track searching and for the reproduction of still pictures from oblique magnetic video track recordings on a magnetic tape, which apparatus is adapted for use in a system including a rotating magnetic-head drum capable of providing position generating pulses.

In accordance with the invention an apparatus is provided for automatic video track searching during the reproduction of still pictures from oblique magnetic video track recordings on a magnetic tape by a video head rotating with a magnetic head drum capable of generating position pulses, there being video signals recorded on the tape in the form of a frequency-modulated carrier wave, said magnetic tape being driven by a transport motor drive assembly and stopped by a transport motor brake assembly. The apparatus of the invention comprises first means to effect a slow speed and complete stopping of said transport motor assembly, second means to produce a voltage proportional to the playback voltage of the video tape at the beginning of each track, and a third means to produce a pulse each time said voltage is going through its minimum. The first means is arbitrarily activated or controlled to switch the tape transport motor to a slow speed. The third means acts upon the first means to stop the tape transport motor.

According to a feature of the invention the first means is a flip-flop which when set arbitrarily, activates the motor drive assembly to slow down the tape transport motor speed and which when reset by the pulse of said third means, activates said motor brake assembly to stop the tape transport motor.

According to a further feature of the invention, the second means include the means to rectify the frequency modulated playback voltage of the video head, means to sample said rectified voltage during the position pulses, means to hold said rectified and sample voltage and means to smoothen the output of said sampling and holding means.

According to still another feature of the invention, said third means includes means to differentiate the output of said second means, means to produce a pulse during the positive going edges of said differentiated voltage and to bring said pulse to the reset terminal of said first means.

The invention will be more clearly understood from the detailed description which follows hereinafter as illustrated in the accompanying drawing.

DETAILED DESCRIPTION

Figure 1:
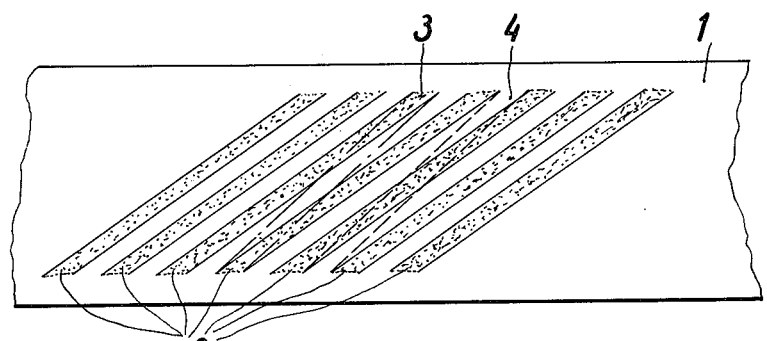
FIG. 1 diagrammatically represents a portion of a magnetic tape with oblique magnetic video track recordings thereon.

According to FIG. 1 and as referred to generally above, oblique tracks 2 are recorded on magnetic tape 1 at normal tape speed. During stops the video head or heads follow, for example, in the direction of tracks 3 and 4 which are drawn in dotted lines. Clearly, track 3 occupies the most unfavorable position with reference to its signal-to-noise ratio, while track 4 occupies the most favorable position. This is because the areas which overlap the space between the tracks fall in the picture edges or in the vertical blanking intervals.

Establishing a favorable track position manually by back-and-forth rotation of the associated tape reels can only be accomplished with a great deal of labor, and sometimes is practically impossible such as, for example, with coaxial reel arrangements. An arrangement for automatic track search has already been proposed (DT-OS No. 2,115,457) as noted above. In this arrangement, the temporal coincidence is determined between the occurrence of the scanned maximum of the envelope curve and the occurrence of a vertical synchronizing pulse. With the aid of control logic for the tape transport motor, provision is made, by means of one or several back-and-forth motions, such that this places the maximum of the envelope curve into the temporal middle of a picture field. In other words, the optimum position of scanning track 4, according to FIG. 1, is achieved by causing the maximum of the envelope curve to coincide with half the time interval between two vertical pulses.

According to FIG. 1, this process can clearly function satisfactorily only if the recorded oblique tracks (tracks 2 in FIG. 1) are actually ideal straight lines. However, in general, this is not the case because minor variations due to tape stretch or other factors cause a slight waveshape or crooked course in the recorded oblique track.

Figure 2A:
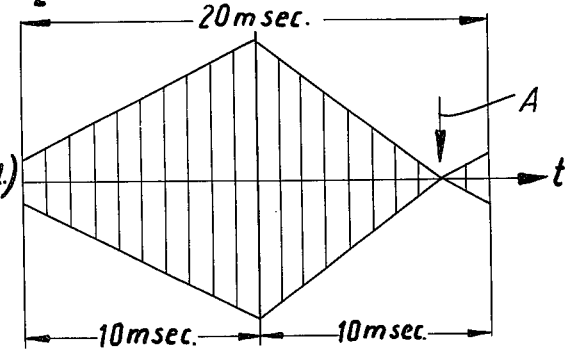
FIG. 2(a) is a signal diagram illustrating the results in automatic track searching systems of the prior art.

For this reason, the maximum of the envelope curve does not occur exactly at the track center, according to FIG. 1, but, on the contrary, is somewhat displaced. Then, the prior art automatic track searching technique, forcing a coincidence between the maximum of the envelope curve and half of the picture field time, causes the scanned voltage of the envelope curve to have a course according to FIG. 2a, where the minimum of the voltage of the envelope curve, characterized by arrow A in FIG. 2a, falls within the visible video picture.

Figure 2B:
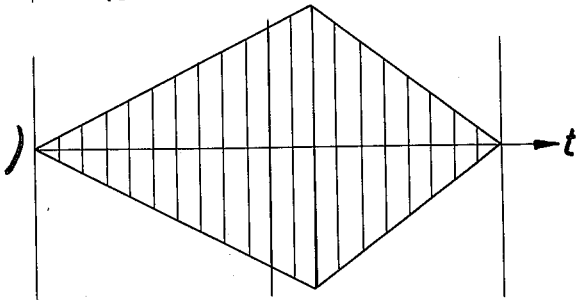
FIG. 2(b) is a signal chart corresponding to that of FIG. 2(a) but achieved according to the results of the invention.

Beginning with this realization, an object of the invention is to provide an arrangement for automatic track searching for the reproduction of still pictures, where the minima of the envelope curve no longer coincide with the visible video picture, but with the vertical blanking intervals. This task is solved by means achieving the result that the scanned voltage of the envelope curve has a course corresponding to FIG. 2b, and thereby provides a noise-free picture.

Figure 3:
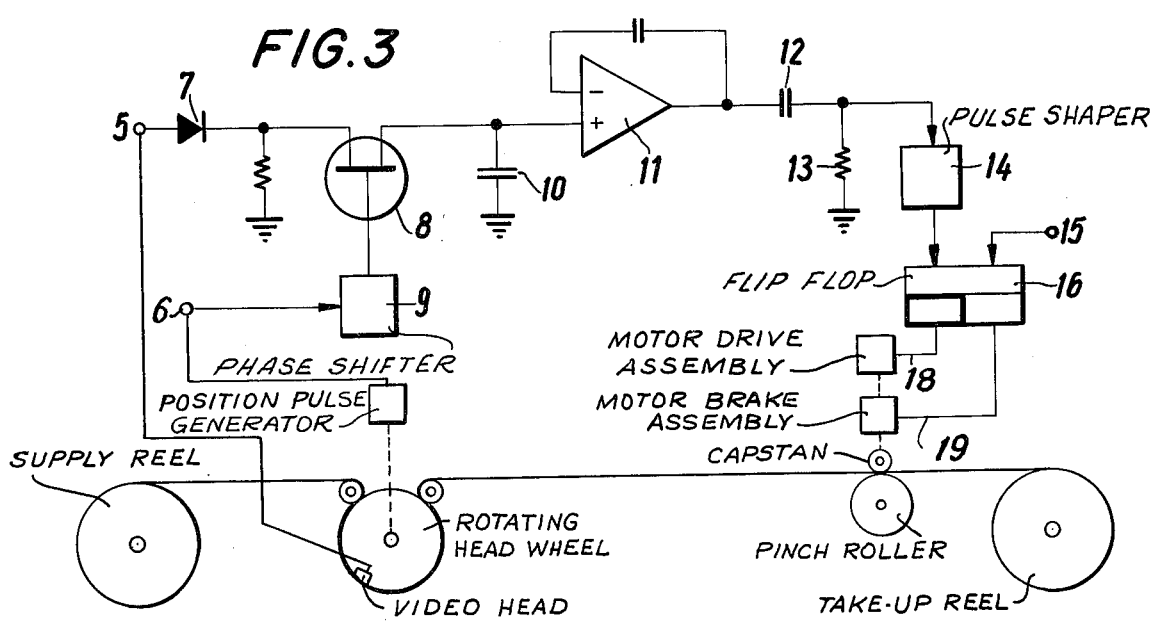
FIG. 3 is a partially schematic and partially block diagram of a circuit for achieving the results desired in accordance with the invention.

Reference is next made to FIG. 3 for a better understanding of the invention. The scanned video voltage is received as a frequency-modulated oscillation. It is fed to terminal 5. At terminal 6, there are supplied position pulses of the rotating head wheel or drum, which undergo at circuit 9 a phase shift to correct phase errors. The oscillation appearing at terminal 5 is rectified or detected by diode 7. The voltage of the resulting envelope curve is scanned through a field effect transistor (FET) 8 or through another electronic switch, during the open time of the position generating pulse. Thus, switching transistor 8 and capacitor 10 constitute a sample and hold circuit.

If a still image is to be reproduced, a starting pulse is introduced at terminal 15. This sets the flip flop 16 and switches on a motor voltage at 18 for slow tape transport drive. A stepwise growing or falling voltage appears at capacitor 10. This voltage is smoothed in integrating section or amplifier 11 and is eventually cleared of transient tape noise. Thus, a voltage corresponding to the upper contour of FIG. 2 appears at the output of integrating section 11. This voltage is differentiated by means of capacitor 12 and resistor 13. The pulse shaper 14 delivers a pulse for positive swings of the input voltage which resets flip flop 16. This switches off the motor voltage activating a motor brake via line 19.

Apparatus is provided for automatic video track searching during the reproduction of still pictures from oblique magnetic video track recordings on a magnetic tape. The apparatus is adapted for use in a system including a rotating magnetic-head drum capable of generating position pulses. The apparatus provides for arbitrarily switching the tape-transport motor down to a slow speed and for a braking circuit to stop the tape-transport motor. A detecting circuit is provided to form a voltage envelope curve from signals generated by the video head or video heads, and a phase shifter for the position pulses compensates for phase errors in the machinery and circuitry. The apparatus also provides for the aforesaid switching upon a temporal coincidence between minima of the aforesaid envelope curve and the phase compensated position pulses. A sample and hold circuit scans the aforesaid envelope curve at times controlled by the phase compensated position pulses. The scanned signal is integrated and differentiated and, through a pulse shaper, operates upon the aforesaid switching means to bring the slow tape-transport motor motion to a complete stop.

In the above appears an arrangement for automatic track searching for the reproduction of still pictures from oblique magnetic video track recordings, with the aid of a detector for an envelope curve, and of a position generator at the video head wheel, which designates the beginning or end of the track. The arrangement is characterized by the use of a control and braking circuit for the tape transport motor. This circuit stops tape transport when the minima of the scanned voltage of the envelope curve coincide temporally with the position generating pulses.

What is claimed is:

1. Apparatus for automatic video track searching during the reproduction of still pictures from oblique magnetic video track recordings on a magnetic tape by at least one video head rotating with a magnetic-head drum capable of generating position pulses, video signal being recorded on said tape in the form of a frequency-modulated carrier wave and said magnetic tape being driven by a transport motor drive assembly and stopped by a transport motor brake assembly, said apparatus comprising first means to effect a slow speed and complete stopping of said transport motor assembly, second means to produce a voltage proportional to the playback voltage of said video head at the beginning of each track, and third means to produce a pulse each time said voltage is going through its minimum; said first means being arbitrarily activated to switch the tape transport motor to a slow speed, and said third means acting upon said first means to stop the tape transport motor.

2. Apparatus as claimed in claim 1 wherein said first means is a flip flop which, when set arbitrarily, activates said motor drive assembly to slow down said tape transport motor speed and which, when reset by the pulse of said third means, activates said motor brake assembly to stop the tape transport motor.

3. Apparatus as claimed in claim 1 wherein said second means includes means to rectify said frequency modulated playback voltage of said video head, means to sample said rectified voltage during said position pulses, means to hold said rectified and sampled voltage, and means to smoothen the output of said sampling and holding means.

4. Apparatus as claimed in claim 1 wherein said third means includes means to differentiate the output of said second means, means to produce a pulse during the positive going edges of said differentiated voltage and to bring said pulse to the reset terminal of said first means.

* * * * *